Figure 1:
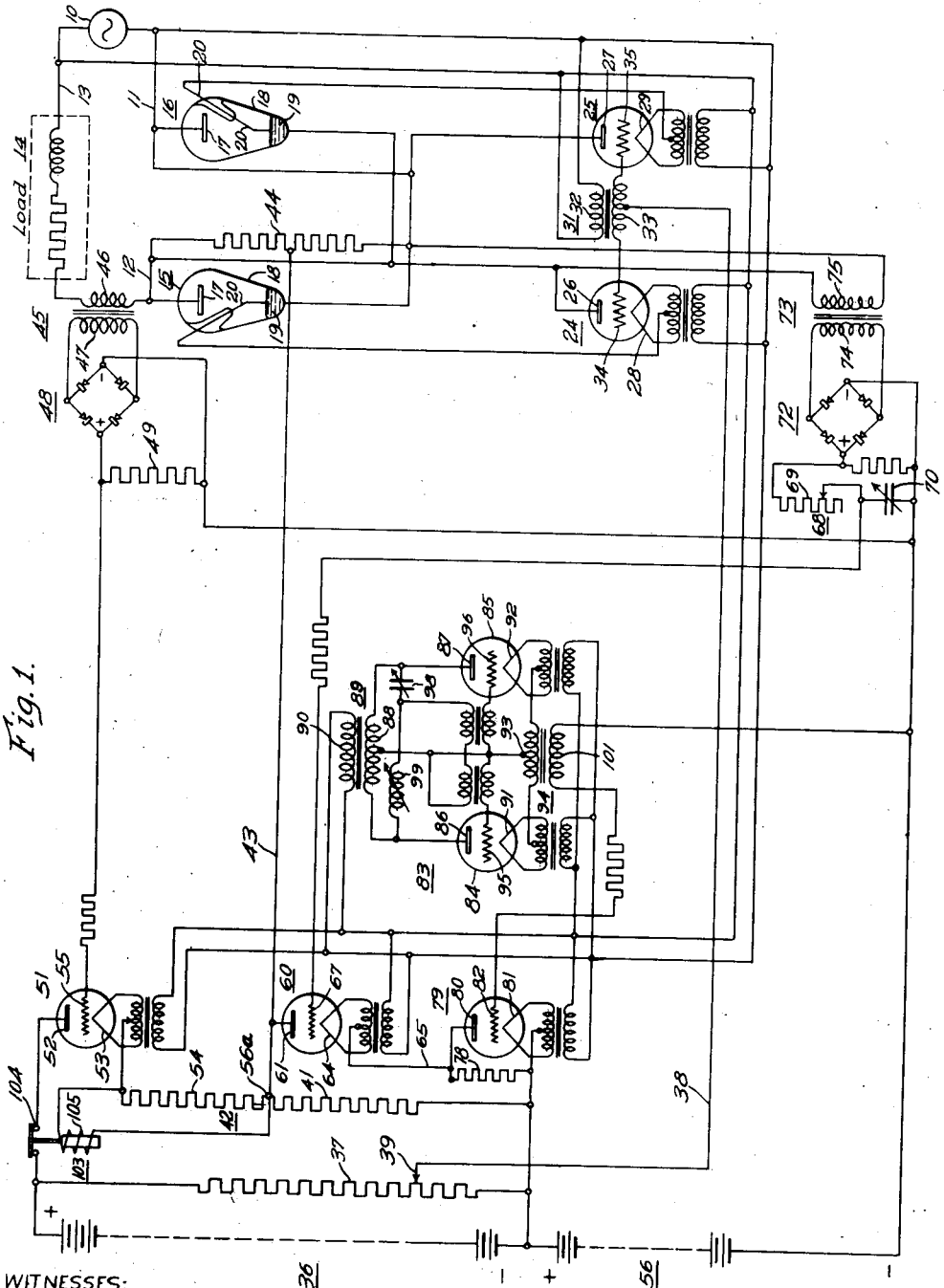

Feb. 23, 1937.  R. N. STODDARD  2,071,860
ELECTRICAL APPARATUS
Filed June 27, 1933  2 Sheets-Sheet 1

WITNESSES:
C.J.Weller.
R.R.Lockwood

INVENTOR
Ralph N. Stoddard.
BY J.M.Crawford
ATTORNEY

Feb. 23, 1937.  R. N. STODDARD  2,071,860
ELECTRICAL APPARATUS
Filed June 27, 1933  2 Sheets-Sheet 2

WITNESSES:
C. J. Weller.
R R Lockwood

INVENTOR
Ralph N. Stoddard.
BY G. M. Crawford
ATTORNEY

Patented Feb. 23, 1937

2,071,860

UNITED STATES PATENT OFFICE 2,071,860

ELECTRICAL APPARATUS

Ralph N. Stoddard, Pittsburgh, Pa., assignor to Westinghouse Electric & Manufacturing Company, East Pittsburgh, Pa., a corporation of Pennsylvania Application June 27, 1933, Serial No. 677,832

17 Claims. (Cl. 175—294)

My invention relates, generally, to electrical apparatus and it has particular relation to electrical control systems.

In electrical transmission systems and the like, it is often desirable to render the system non-conducting substantially instantaneously on the occurrence of a fault, particularly a fault resulting from an ionized condition which normally would disappear if the ionizing potential causing it were removed immediately. If the circuit can be reestablished after the ionized condition has been removed or has disappeared, the electrical inertia of the system will be substantially unaffected, and there will be no material disturbance in the character thereof. Under such conditions, the disturbance in the system caused by the opening and closing of the circuit for a brief interval would be reduced to a minimum.

In certain instances, it is desirable to reclose an alternating-current circuit, after it has been opened at a particular instant, in any succeeding half cycle in order to reduce transient phenomena to a minimum, especially those disturbances which are caused as the result of the saturation of the iron in transformers which are customarily connected to the system.

In the past, it has not been possible to achieve this ultra-high-speed in the opening of an electrical circuit and at the same time to provide for its being restored to the normal conducting state at a particular instant in a succeeding half cycle of the alternating current with any of the customary circuit breakers or switches of the mechanical type which depend for their operation upon the movement of a mechanical conducting link or connector to open the circuit. Further, according to the prior art, in order to effect the opening of the circuit breaker, it is necessary to control this function by means of mechanical relays which are intended to be operated to effect the opening of the circuit breaker on the occurrence of a fault or abnormal condition in the load circuit. The time required for the operation of these control relays is often of considerable length.

The object of my invention generally stated is to provide a system for quickly opening and accurately reclosing an alternating-current system which shall be simple and efficient in operation and which may be readily and economically constructed and installed.

The principal object of my invention is to render an electrical circuit non-conducting immediately upon the occurrence of a fault or abnormal condition therein and to restore the circuit to the conducting condition a predetermined time after it has been rendered non-conducting.

Another object of my invention is to provide for rendering an alternating-current circuit non-conducting at the end of a half cycle in which a fault occurs.

A further object of my invention is to provide for rendering an alternating-current circuit non-conducting at the end of a half cycle in which a fault occurs and restoring the circuit to conducting condition a predetermined time after it has been rendered non-conducting.

Still another object of my invention is to provide for restoring an alternating-current circuit to conducting condition at any time within a succeeding predetermined half cycle of the alternating current after the circuit has been rendered non-conducting.

A still further object of my invention is to restore an alternating-current circuit to conducting condition at a predetermined instant in a succeeding half cycle of the alternating current after the expiration of a predetermined time interval.

Other objects of my invention will in part be obvious and in part appear hereinafter.

My invention accordingly is disclosed in the embodiment hereof shown in the accompanying drawings and comprises the features of construction, the combination of elements, and arrangement of parts which will be exemplified in the construction hereinafter set forth, and the scope of the application of which will be indicated in the appended claims.

Figure 2:
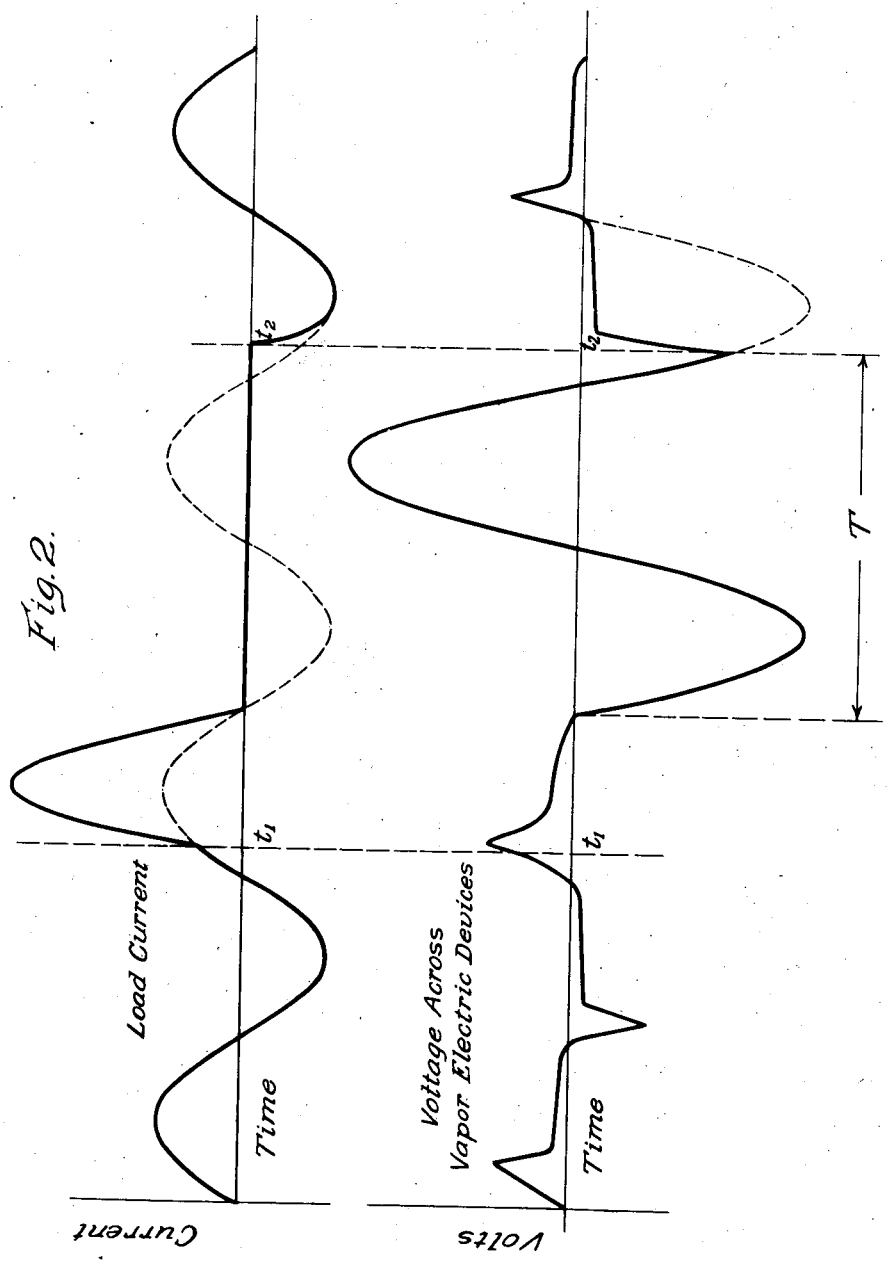

For a more complete understanding of the nature and scope of my invention, reference may be had to the following detailed description taken in connection with the accompanying drawings, in which:

Figure 1 is a diagrammatic view illustrating a particular embodiment of my invention; and Fig. 2 shows a number of curves which demonstrate the characteristics possessed by the control system illustrated in Fig. 1.

Referring now particularly to Fig. 1 of the drawings, the reference character 10 designates a source of alternating current, such as a 60-cycle generator, which may be connected by a load circuit represented by the conductors 11, 12 and 13 to any desired load, illustrated generally at 14, which it will be readily understood may comprise any type of load which may be energized from an alternating-current source. In order to provide for opening the load circuit between the generator 10 and the load 14, a pair of oppositely connected uni-directional current-conducting vapor electric devices 15 and 16 are provided in series circuit relation between conductors 11 and 12, as illustrated.

The vapor electric devices 15 and 16 are of the mercury vapor type, each of which is provided with an anode 17, as illustrated, in a suitable container 18, in the bottom of which is located a pool of mercury 19 forming a cathode. In order to render the vapor electric devices 15 and 16 conducting, a starting electrode or crystal 20 is provided which may comprise a material such as barium, silicon-carbide, or the like. While two individual vapor electric devices 15 and 16 are illustrated, it will be readily understood that a single vapor electric device having two mercury pools may be used, in which the mercury pools alternately function as anode and cathode.

It has been found that, when a certain amount of current is caused to flow through the starting electrode 20 into the mercury pool 19, a cathode spot is formed which causes the mercury vapor within the container 18 to become conducting, provided the proper polarity is applied to the anode 17 and the mercury pool 19. Thus it is only necessary to pass sufficient starting current through the starting electrode 20 to form the cathode spot, at the beginning of the proper half cycle of the alternating-current wave, in order to render the vapor electric devices 15 and 16 conducting for the remainder of their respective half cycles.

In order to conduct succeeding half cycles of alternating current, the vapor electric devices 15 and 16 are connected inversely as illustrated and as set forth hereinbefore; that is, the anode 17 and the cathode 19 of the devices 15 and 16, respectively, are connected together, while the cathode 19 and the anode 17 of these respective devices are also connected together, as shown in the drawings.

It will, therefore, be evident that, if the vapor electric devices 15 and 16 are rendered conducting by the passage of current through the starting electrodes 20, current from the generator 10 will flow to the load 14 as long as this condition is maintained.

In order to render the vapor electric devices 15 and 16 conducting, control tubes 24 and 25, of the hot-cathode type, are provided, and their anodes 26 and 27 are connected to the anodes of the vapor electric devices 15 and 16, respectively, as shown. The cathodes 28 and 29 of the control tubes 24 and 25 are connected in the customary manner to the starting electrodes 20 of the vapor electric devices 15 and 16, respectively. The control tubes 24 and 25 are arranged to pass sufficient current through the starting electrodes 20 so that the cathode spots will be formed, as set forth hereinbefore, for the purpose of rendering the vapor electric devices 15 and 16 conducting.

In order to control both of the control tubes 24 and 25 from a single control circuit, a transformer, illustrated generally at 31, is provided having a primary winding 32 connected, as illustrated, across the alternating-current source 10 and a secondary winding 33, the terminals of which are connected to the grids 34 and 35 of the control tubes 24 and 25, respectively. As will be readily understood, the transformer 31 reduces the potentials of the cathodes 28 and 29 to a common point or potential.

In order to render the control tubes 24 and 25 conducting, a positive potential is continually applied to the grids 34 and 35 from a direct-current source 36, which may be a battery or any other suitable source of direct-current potential. The desired positive potential for the grids 34 and 35 is obtained by means of the variable resistor 37, to which a conductor 38 may be connected by means of the movable connection 39. The negative potential for the cathodes 28 and 29 may be obtained from the battery 36 through a lower section 41 of a voltage dividing resistor, shown generally at 42, through conductor 43, resistor 44, mercury pools 19 and starting electrodes 20 of the vapor electric devices 15 and 16 to the cathodes 28 and 29, respectively.

In order to render the vapor electric devices 15 and 16 non-conducting on the occurrence of a fault, such as a short circuit, or other abnormal condition in the load circuit, represented by the conductors 11, 12 and 13, or in the load 14 itself, a current transformer, illustrated generally at 45, is provided having a primary winding 46 connected in series circuit relation with the load circuit, as illustrated. The transformer 45 is provided with a secondary winding 47 which is connected across the alternating-current terminals of a rectifier 48, which may be of the well known copper oxide type. A resistor 49 is connected across the direct-current terminals of the rectifier 48 in order to provide a continuous load for the transformer 45.

A stop tube, shown generally at 51, is provided having an anode 52 connected to the positive terminal of the battery 36, and a hot cathode 53 connected to a terminal of an upper section 54 of the voltage dividing resistor 42. A grid 55 is provided in the stop tube 51 for controlling the operation thereof, and a negative potential is applied thereto from a battery 56 over a circuit which is readily apparent to maintain the stop tube in the non-conducting condition.

Under normal operating conditions, the potential which is applied to the grid 55 by means of the rectifier 48 is less than the potential applied thereto by means of the battery 56, or in other words, the potential of the grid 55 is maintained negative relative to the cathode 53 despite the application of a slight positive potential by means of the rectifier 48. However, upon the occurrence of a fault in the load circuit, the current flowing through the primary winding 46 of transformer 45, raises to a relatively high value which is reflected by the application of a relatively high direct-current potential across the resistor 49 which is sufficient to overcome the negative potential applied to the grid 55. The grid 55 is then biased sufficiently positive with respect to the cathode that the stop tube 51 is rendered conducting.

When the stop tube is rendered conducting, current is permitted to flow through the voltage dividing resistor 42 with the result that a point 56a, which had been previously maintained at the negative potential of the battery 36, is now raised to a positive potential which is greater than the positive potential that is applied to the grids 34 and 35 of tubes 24 and 25, from the variable resistor 37. As a result, the grids 34 and 35 become negative relative to the cathodes 28 and 29 of the control tubes 24 and 25, respectively, so that at the end of the half cycle in which the fault occurs, the control tubes 24 and 25 are no longer maintained in the conducting state. As a result, current is not caused to flow through the starting electrodes 20 of the vapor electric devices 15 and 16 at the beginning of succeeding half cycles with the result that they remain non-conducting until current is again applied to the starting electrodes 20.

It is desirable to restore the vapor electric devices 15 and 16 to the conducting condition at some predetermined time after they have been rendered non-conducting. During this interval, the condition causing the fault in the load circuit may have been cleared away or removed with the result that the system may be then restored to normal operating condition. For this purpose, a first start tube, shown generally at 60, is provided having an anode 61, which is connected to the conductor 43, and a hot cathode 64, which may be connected by means of a conductor 65 and resistor 78 to the negative terminal of the battery 36. The magnitude of resistor 78 may have either a small value substantially equivalent to a short circuit or a large value. I shall first discuss the operation when resistor 78 has a small magnitude.

In order to render the first start tube 60 conducting a predetermined time after the vapor electric devices 15 and 16 have been rendered non-conducting, the grid 67 thereof is energized from a timing circuit, illustrated generally at 68. The timing circuit comprises a variable resistor 69 and a variable capacitor 70 connected in series circuit relation, the common connection therebetween being connected to the grid 67, as illustrated. The timing circuit 68 is connected to be energized from a second rectifier, shown generally at 72, which may be of the copper-oxide type. As shown in the drawings, the rectifier 72 is energized by means of a transformer 73, having a secondary winding 74 connected to the alternating-current terminals of the rectifier 72 and a primary winding 75 connected across the vapor electric devices 15 and 16.

It will be readily understood that the first start tube 60 will be rendered conducting by the application of a positive potential to the grid 67 at a time which is a function of the product of the resistance of the resistor 69 and the capacitance of the capacitor 70. It will also be understood that the positive potential will not be applied to the grid 67 until the vapor electric devices 15 and 16 are rendered non-conducting, so that the voltage which is applied to the primary winding 75 of the transformer 73 under this condition is relatively much greater than the voltage which is normally applied thereto when these devices are conducting. It will be further understood that the grid 67 has applied thereto a negative potential from the battery 56 over an obvious circuit.

While the system with resistor 78 small that has been described hereinbefore is capable of restoring the vapor electric devices 15 and 16 to the conducting condition a predetermined time after they have been rendered non-conducting, it may be desirable to render them again conducting at a particular point in the succeeding half cycle during which they would be normally restored to operation as predetermined by means of the timing circuit 68. With this operation in view, a resistor 78 having a relatively high ohmic value may be used, in order to establish the cathode 64 at a definite potential.

A second start tube, shown generally at 79, is provided having an anode 80, connected to the conductor 65, and a hot cathode 81, which is connected to the negative terminal of the battery 36. The second start tube 79 is provided with a grid 82 which may be energized from a phase-shifting control circuit, shown generally at 83.

The phase-shifting control circuit 83 comprises a pair of timing tubes 84 and 85, the anodes 86 and 87 of which are connected to a secondary winding 88 of a transformer 89, the primary winding 90 of which is connected over an obvious circuit to the alternating-current source 10. The cathodes 91 and 92 are connected to the terminals of a primary winding 93 of a transformer 94, having a highly saturable core. The grids 95 and 96 of the timing tubes 84 and 85 are connected to be energized from a phase-shifting circuit, as illustrated, comprising a variable capacitor 98 and a variable inductor 99. Thus, depending upon the adjustment of the capacitor 98 and the inductor 99, the timing tubes 94 and 95 will be conducting at any point in any half cycle in accordance therewith.

It will be observed that the grid 82 of the second start tube 79, is connected to the secondary winding 101 of the transformer 94. In operation, the grid 82 has applied thereto a negative potential from the battery 56, but this potential is overcome and a positive potential is applied to this grid from the phase-shifting circuit 83 at an instant in each half cycle which is determined by the adjustment of the capacitor 98 and the inductor 99, as will be readily understood by those skilled in the art.

Since the stop tube 51 and the first and second start tubes 60 and 79 characteristically tend to remain in the conducting state, even after the ionizing potentials applied to their respective grids have been removed, it is essential that some means be provided to open the circuit from the battery 36 so that the system may be restored to its normal operating condition. With a view to thus restoring the system to its normal condition, a reset relay 103, is provided having contact members 104 connected in series circuit relation, as shown, with the circuit connecting the positive terminal of the battery 36 and the anode 52 of the stop tube 51. The reset relay 103 is provided with a winding 105 which is connected in shunt circuit relation with the section 54 of the voltage dividing resistor 42.

The contact members 104 of the reset relay 103 are normally in the closed position, as illustrated, when the relay is de-energized. The contact members 104 will remain in this condition until the section 41 of the voltage dividing resistor 42 is short circuited by the first and second start tubes 60 and 79. At this time, sufficient voltage will be applied across the section 54 of the voltage dividing resistor 42 to energize the winding 105 sufficiently to open the contact members 104. It will be readily understood that, when the stop tube 51 alone is conducting, the voltage drop across section 54 of the voltage dividing resistor 52 is not sufficient, when applied to the winding 105, to effect the energization of the reset relay 103 to open the contact members 104.

It will be readily apparent that various modifications of the hereinbefore described control system may be made. As indicated, the second start tube 79 may be omitted, the resistor 78 made small, and the time of restoring the vapor electric devices 15 and 16 to the continuous conducting condition placed solely under the control of the first start tube 60, the operation of which is in turn controlled by the timing circuit 68.

Since the control tubes 24 and 25 are in shunt circuit relation with the vapor electric devices 15 and 16, it will be readily apparent that these devices may be omitted under certain conditions of extremely small currents which are within the capacity of the control tubes 24 and 25 to conduct. However, where it is necessary to conduct relatively large currents, such as several hundred amperes, it will be, of course, preferable to use the vapor electric devices 15 and 16, which are not only capable of continuously carrying these relatively high currents of several hundred amperes, but are also capable of withstanding extreme overloads over relatively short intervals of time without injury.

It will also be apparent that a single vapor electric device 15 or 16 may be used with the control system to act as a half-wave rectifier for use in providing the proper high direct-current potential which may be used for energizing precipitators of the electrostatic type. For the control of a single vapor electric device, only one of the control tubes 24 or 25 will be required, as will be readily apparent. It is also possible for this circuit to use a single timing tube 84 or 85 rather than to use two timing tubes, as illustrated in the drawings.

In order to more clearly describe the operation of the control system illustrated in Fig. 1 of the drawings, reference may be had to the curves illustrated on Fig. 2 of the drawings. The two curves illustrated are plotted having units of time as the abscissæ for both, while the upper curve has the units of current for ordinates, and the lower curve has units of volts for the ordinates. The current represented by the upper curve is the current flowing through the load 14 and through the vapor electric devices 15 and 16, while the voltage curve represents the voltage which exists across either of the vapor electric devices 15 or 16. The left-hand end of both curves illustrates normal operating conditions which may exist in the system when the vapor electric devices 15 and 16 are continuously conducting current.

Referring particularly to the time $t_1$, on the upper curve, it will be observed that at this instant the current rises to an abnormally high value due to a fault in the load circuit which may have been caused by an ionized condition resulting from a short circuit, or from some other cause, as will be readily understood. Due to the abnormal rise in the current occurring immediately after the time $t_1$, a relatively large current will flow in the secondary winding 47 of the current transformer 45. A relatively high direct-current potential is thus applied across the resistor 49 and to the grid 55, which is sufficient to overcome the negative potential normally applied to this grid, with the result that the stop tube 51 becomes conducting. Direct current from the battery 36 then flows through the voltage dividing resistor 42 and the point 56a therealong is now raised to a positive potential where formerly it was at the negative potential of the battery 36. This change in the potential of the point 56a removes the positive potential from the grids 34 and 35 of the control tubes 24 and 25, with the result that they are not caused to become conducting at the succeeding half cycle, as will be readily understood. At the end of the half cycle in which the fault occurs, neither of the control tubes 24 and 25 will be in conducting condition, so that current will not be applied to either of the starting electrodes 20 in the vapor electric devices 15 and 16 to cause either of them to become conducting at the beginning of the next half cycle.

It will, therefore, be apparent that any fault occurring in a half cycle will be cleared at the end of that half cycle. Since either of the vapor electric devices 15 or 16 is fully capable because of their inherent characteristics of withstanding a heavy overload which may be many times the normal current capacity thereof for the remainder of the half cycle, it will be apparent that if neither of the vapor electric devices 15 or 16 are rendered conducting at the beginning of the next half cycle the fault will be properly cleared. It will be observed that the dotted line in the upper curve represents the normal variation in the current which would have continued had no fault occurred. However, because of the fact that neither of the vapor electric devices 15 nor 16 is rendered conducting, the current is reduced to zero, as illustrated, until the time $t_2$.

At the end of the half cycle in which the fault occurs, the vapor electric devices 15 and 16 are rendered non-conducting, and for this reason open circuit voltage exists across them, as indicated by the lower curve representing the voltage which exists across these devices. As set forth hereinbefore, this higher voltage is applied to the rectifier 72 through the transformer 73 to apply a relatively high direct-current potential across the timing circuit 68 to cause the capacitor 70 to become charged.

It will be readily understood that the capacitor 70 will become charged at the time depending upon the resistance of the resistor 69 and the capacitance of the capacitor 70, so that after the expiration of a predetermined time interval, a positive potential will be applied to the grid 67 of the first start tube 60 to render it in conducting condition. At this instant, if the second start tube 79 is omitted and the connection 66 is employed, then the first start tube 60 will become conducting, thereby short circuiting the section 41 of the voltage dividing resistor 42 with the result that the point 56a is again placed at the negative potential of the battery 36. The positive ionizing potential is then reapplied to the grids 34 and 35 of the control tubes 24 and 25 and the vapor electric devices 15 and 16 are again rendered conducting during their corresponding half cycles.

The time interval occurring after the timing circuit 68 was affected by the open circuit voltage which exists across the vapor electric devices 15 and 16 may be represented by the time T. Thus at the expiration of the time T, which may be represented by the time $t_2$, as illustrated, the vapor electric devices 15 and 16 will again be rendered conducting. As fully set forth hereinbefore, the time T may be adjusted by varying the resistor 69 and the capacitor 70 so that substantially any desired time T may be obtained.

It has been found, however, that the time T which may be obtained by the timing circuit 68 cannot practically be adjusted sufficiently accurately to restore the vapor electric devices 15 and 16 to the conducting condition at any desired instance in a succeeding half cycle of the alternating current. For this reason, the phase-shifting control circuit 83 is provided which prevents the first start tube 60 from becoming conducting until the predetermined point in the successive half cycle of the alternating current occurs, which is determined by the setting of the capacitor 98 and the inductor 99 in the phase-shifting circuit 83. The setting of these devices determines the instant in each succeeding half cycle at which a potential impulse will appear across the terminals of the winding 101 of the highly saturable transformer 94 to apply a proper ionizing potential to the grid 82, so that the second start tube 79 will be rendered conducting. Since the first start tube 60 has been previously rendered conducting by the application of the proper ionizing potential to the grid 67 by means of the timing circuit 68, the section 41 of the voltage dividing resistor 42 will then be short circuited and the point 56 will be reduced to the negative potential of the battery 36. The vapor electric device 15 or 16 is thus rendered conducting at that instant, as has been set forth hereinbefore.

It will thus be apparent that the timing circuit 68 may be employed to determine the particular half cycle within which the vapor electric devices 15 and 16 are to be restored to their normal conducting condition, and that the phase-shifting control circuit 83 may be employed to predetermine the exact instant in the succeeding half cycle at which either of these devices will be restored to the conducting condition.

As set forth hereinbefore, as soon as the section 41 of the voltage dividing resistor 42 is short circuited, sufficient potential is applied to the winding 105 to energize the relay 103, thereby opening the contact members 104. The stop tube 51 and the first and second start tubes 60 and 79 are thereupon rendered non-conducting, the winding 105 is de-energizing, and the system is restored to the normal continuous conducting state, at which time the foregoing sequence of operation may be repeated in the event that a second fault should occur in the load system or the previous fault should still exist.

While the foregoing system has been described as being entirely automatic in its operation, it will be readily apparent that manual control circuits may be applied for effecting the energization of the grid 55 of the stop tube 51 with the proper ionizing potential so that the vapor electric devices 15 and 16 may be rendered non-conducting at will for a period of time which is determined by either the timing circuit 68 alone or the timing circuit 68 and the phase-shifting control circuit 83, as set forth hereinbefore.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. In an electric system for supplying current from a source of alternating current to a load, in combination, circuit means connecting the current source to the load, vapor electric means interposed in the circuit means, control means connected to render the vapor electric means normally conducting to continually conduct current to the load, stop control means connected to render the first named control means ineffective to maintain the vapor electric means in the conducting state, start control means connected to render the first named control means effective to restore the vapor electric means to the continuous conducting state, and timing means connected to initiate the functioning of the start control means within a predetermined succeeding half cycle of the alternating current.

2. In an electric system for supplying current from a source of alternating current to a load, in combination, circuit means connecting the current source to the load, space discharge means interposed in the circuit means and adapted to be normally conducting to continually conduct current to the load, stop control means connected to render the space discharge means non-conducting to prevent the further flow of current to the load, start control means connected to restore the space discharge means to the conducting state to re-establish the continuous flow of current to the load, timing means connected to initiate the functioning of the start control means within a predetermined succeeding half cycle of the alternating current, and additional timing means connected to prevent the initiation of the functioning of the start control means until the occurrence of a predetermined instant in the succeeding half cycle of alternating current.

3. In an electric system for supplying current from a source of alternating current to a load, in combination, circuit means connecting the current source to the load, a uni-directional current conducting vapor electric device interposed in the circuit means, igniting means in said device, space discharge means connected to energize said igniting means for rendering the vapor electric device normally conducting to continuously conduct current to the load, stop control means connected to render the space discharge means ineffective to maintain the vapor electric device in the conducting state, start control means connected to render the space discharge means effective to restore the vapor electric device to the continuous conducting state, and timing means connected to initiate the functioning of the start control means within a predetermined succeeding half cycle of the alternating current.

4. In an electric system for supplying current from a source of alternating current to a load, in combination, circuit means connecting the current source to the load, a uni-directional current conducting vapor electric device interposed in the circuit means, igniting means in said device, space discharge means connected to energize said igniting means for rendering the vapor electric device normally conducting to continuously conduct current to the load, stop control means connected to render the space discharge means ineffective to maintain the vapor electric device in the conducting state, start control means connected to render the space discharge means effective to restore the vapor electric device to the continuous conducting state, timing means connected to initiate the functioning of the start control means within a predetermined succeeding half cycle of the alternating current, and additional timing means connected to prevent the initiation of the functioning of the start control means until the occurrence of a predetermined instant in the succeeding half cycle of the alternating current.

5. In an electric system for supplying current from a source of alternating current to a load, in combination, circuit means connecting the current source to the load, a pair of oppositely connected uni-directional current conducting vapor electric devices interposed in the circuit means, igniting means in said devices, a space discharge device individual to each of the vapor electric devices for energizing said igniting means to render said devices normally conducting to continuously conduct current to the load, stop control means connected to render the space discharge devices ineffective to maintain the vapor electric devices in the conducting state, start control means connected to render the space discharge devices effective to restore the vapor electric devices to the continuous conducting state, and timing means connected to initiate the functioning of the start control means within a predetermined succeeding half cycle of the alternating current.

6. In an electric system for supplying current from a source of alternating current to a load, in combination, a load circuit connecting the current source to the load, a pair of oppositely connected uni-directional current conducting vapor electric devices interposed in the load circuit, a space discharge device individual to each of the vapor electric devices to render them normally conducting to continuously conduct current to the load, a grid and a cathode in each space discharge device, circuit means connecting the grids and cathodes across a source of ionizing potential to maintain the space discharge means in continuously operative condition, a voltage dividing resistor and a stop space discharge device having a grid and a cathode connected in series circuit relation and across the source of ionizing potential, circuit means connecting a point along the voltage dividing resistor to the cathodes of the first named space discharge devices, a current transformer having a primary winding connected in series circuit relation with the load circuit and a secondary winding, a rectifier connected across the secondary winding and circuit means connecting the direct current terminals of the rectifier across the grid and cathode of the stop discharge tube to render said tube conducting on the flow of a predetermined current in the load circuit thereby permitting current to flow through the voltage dividing resistor and removing the ionizing potential from the grids of the first named space discharge devices to render said devices ineffective for maintaining the vapor electric devices in the conducting state.

7. In an electric system for supplying current from a source of alternating current to a load, in combination, a load circuit connecting the current source to the load, a pair of oppositely connected uni-directional current conducting vapor electric devices interposed in the load circuit, a space discharge device individual to each of the vapor electric devices to render them normally conducting to continuously conduct current to the load, a grid and a cathode in each space discharge device, circuit means connecting the grids and cathodes across a source of ionizing potential to maintain the space discharge means in continuously operative condition, a voltage dividing resistor and a stop space discharge device having a grid and a cathode connected in series circuit relation and across the source of ionizing potential, circuit means connecting a point along the voltage dividing resistor to the cathodes of the first named space discharge devices, a current transformer having a primary winding connected in series circuit relation with the load circuit and a secondary winding, a rectifier connected across the secondary winding, circuit means connecting the direct current terminals of the rectifier across the grid and cathode of the stop discharge tube to render said tube conducting on the flow of a predetermined current in the load circuit thereby permitting current to flow through the voltage dividing resistor and removing the ionizing potential from the grids of the first named space discharge devices to render said devices ineffective for maintaining the vapor electric devices in the conducting state, a start space discharge device having a grid connected in shunt circuit relation with a portion of the voltage dividing resistor and to said point therealong, a second rectifier, circuit means connecting the second rectifier across the vapor electric devices, a resistor and capacitor connected in series circuit relation and across the direct current terminals of the second rectifier, and circuit means connecting the common connection between the resistor and capacitor to the grid of the start space discharge device to apply an ionizing potential thereto a predetermined time after the vapor electric devices are rendered non-conducting to render the start space discharge devices conducting, thereby restoring the ionizing potential to the grids of the first named space discharge devices to render said devices again effective for maintaining the vapor electric devices in the conducting state.

8. In an electric system for supplying current from a source of alternating current to a load, in combination, a load circuit connecting the current source to the load, a pair of oppositely connected uni-directional current conducting vapor electric devices interposed in the load circuit, a space discharge device individual to each of the vapor electric devices to render them normally conducting to continuously conduct current to the load, a grid and a cathode in each space discharge device, circuit means connecting the grids and cathodes across a source of ionizing potential to maintain the space discharge means in continuously operative condition, a voltage dividing resistor and a stop space discharge device having a grid and a cathode connected in series circuit relation and across the source of ionizing potential, circuit means connecting a point along the voltage dividing resistor to the cathodes of the first named space discharge devices, a current transformer having a primary winding connected in series circuit relation with the load circuit and a secondary winding, a rectifier connected across the secondary winding, circuit means connecting the direct current terminals of the rectifier across the grid and cathode of the stop discharge tube to render said tube conducting on the flow of a predetermined current in the load circuit thereby permitting current to flow through the voltage dividing resistor and removing the ionizing potential from the grids of the first named discharge devices to render said devices ineffective for maintaining the vapor electric devices in the conducting state, a first and a second space discharge device, each having a grid, connected in series circuit relation and in shunt circuit relation with a portion of the voltage dividing resistor and to said point therealong, a second rectifier, circuit means connecting the second rectifier across the vapor electric devices, a resistor and a capacitor connected in series circuit relation and across the direct current terminals of the second rectifier, circuit means connecting the common connection between the resistor and capacitor to the grid of the first start space discharge device to apply an ionizing potential thereto a predetermined time after the vapor electric devices are rendered non-conducting to render the first start space discharge device conducting, and phase shifting means connected to be energized from said source of alternating current and to the grid of the second start space discharge device for applying an ionizing potential thereto at a predetermined instant in any half cycle of the alternating current to render the start space discharge devices conducting, thereby restoring the ionizing potential to the grids of the first named space discharge devices to render said devices again effective for maintaining the vapor electric devices in the conducting state.

9. In an electric system for supplying current from a source of alternating current to a load, in combination, a load circuit connecting the current source to the load, a pair of oppositely connected uni-directional current conducting vapor electric devices interposed in the load circuit, a space discharge device individual to each of the vapor electric devices to render them normally conducting to continuously conduct current to the load, a grid and a cathode in each space discharge device, circuit means connecting the grids and cathodes across a source of ionizing potential to maintain the space discharge means in a continuously operative condition, a voltage dividing resistor and a stop space discharge device having a grid and a cathode connected in series circuit relation and across the source of ionizing potential, circuit means connecting a point along the voltage dividing resistor to the cathodes of the first named space discharge devices, a current transformer having a primary winding connected in series circuit relation with the load circuit and a secondary winding, a rectifier connected across the secondary winding, circuit means connecting the direct current terminals of the rectifier across the grid and cathode of the stop discharge tube to render said tube conducting on the flow of a predetermined current in the load circuit thereby permitting current to flow through the voltage dividing resistor and removing the ionizing potential from the grids of the first named space discharge devices to render said devices ineffective for maintaining the vapor electric devices in the conducting state, a first and a second space discharge device, each having a grid, connected in series circuit relation and in shunt circuit relation with a portion of the voltage dividing resistor and to said point therealong, a second rectifier, circuit means connecting the second rectifier across the vapor electric devices, a resistor and a capacitor connected in series circuit relation and across the direct current terminals of the second rectifier, circuit means connecting the common connection between the resistor and capacitor to the grid of the first start space discharge device to apply an ionizing potential thereto a predetermined time after the vapor electric devices are rendered nonconducting to render the first start space discharge device conducting, phase shifting means connected to be energized from said source of alternating current and to the grid of the second start space discharge device for applying an ionizing potential thereto at a predetermined instant in any half cycle of the alternating current to render the start space discharge devices conducting, thereby restoring the ionizing potential to the grids of the first named space discharge devices to render said devices again effective for maintaining the vapor electric devices in the conducting state, and a reset relay having normally closed contact members connected in series circuit relation with the stop space discharge device and a winding connected in shunt circuit relation with a portion of the voltage dividing resistor, the reset relay being adapted to be energized when the start space discharge devices are rendered conducting for opening the contact members to render the stop space discharge device non-conducting, thereby restoring the system to normal condition.

10. In an electric system for supplying current from a source of alternating current to a load, in combination, circuit means connecting the current source to the load, vapor electric means interposed in the circuit means, control means connected to render the vapor electric means normally conducting to continually conduct current to the load, stop control means connected to render the first named control means ineffective to maintain the vapor electric means in the conducting state, start control means connected to render the first named control means effective to restore the vapor electric means to the continuous conducting state, timing means connected to initiate the functioning of the start control means within a predetermined succeeding half cycle of the alternating current, and additional timing means connected to prevent the initiation of the functioning of the start control means until the occurrence of a predetermined instant in the succeeding half cycle of the alternating current.

11. In an electric system for supplying current from a source of alternating current to a load, in combination, circuit means connecting the current source to the load, space discharge means interposed in the circuit means and adapted to be normally conducting to continually conduct current to the load, stop control means connected to render the space discharge means non-conducting to prevent the further flow of current to the load, start control means connected to restore the space discharge means to the conducting state to re-establish the continuous flow of current to the load, and timing means connected to initiate the functioning of the start control means within a predetermined succeeding half cycle of the alternating current.

12. In an electric system for supplying current from a source of alternating current to a load, in combination, circuit means connecting the current source to the load, a pair of oppositely connected uni-directional current conducting vapor electric devices interposed in the circuit means, a space discharge device individual to each of the vapor electric devices to render them normally conducting to continuously conduct current to the load, stop control means connected to render the space discharge devices ineffective to maintain the vapor electric devices in the conducting state, start control means connected to render the space discharge devices effective to restore the vapor electric devices to the continuous conducting state, timing means connected to initiate the functioning of the start control means within a predetermined succeeding half cycle of the alternating current, and additional timing means connected to prevent the initiation of the functioning of the start control means until the occurrence of a predetermined instant in the succeeding half cycle of the alternating current.

13. In an electric system for supplying current from a source of alternating current to a load, in combination, circuit means connecting the current source to the load, space discharge means connected in said circuit means and disposed to be normally conducting to continually permit the flow of current to the load, stop control means connected to render the space discharge means non-conducting to reduce the flow of current to the load, start control means connected to restore the space discharge means to the conducting state to re-establish the continuous flow of current to the load, and timing means connected to initiate the functioning of the start control means at a predetermined instant in a succeeding cycle of the alternating current.

14. In an electric system for supplying current from a source of alternating current to a load, in combination, circuit means connecting the current source to the load, space discharge means connected in said circuit means and disposed to be normally conducting to continually permit the flow of current to the load, stop control means connected to render the space discharge means non-conducting to reduce the flow of current to the load, start control means independent of said stop control means connected to restore the space discharge means to the conducting state to reestablish the continuous flow of current to the load, and timing means connected to initiate the functioning of the start control means a predetermined number of half cycles after the space discharge means is rendered non-conducting.

15. In a system of transmission and distribution a periodic current source, a load circuit, a conductor for connecting said source to said load, a discharge path in said conductor comprising an electrode of the mercury type and a collecting electrode to cooperate with said electrode of the mercury type, said mercury in the absence of a discharge presenting an unionized surface to said collecting electrode and said discharge path in the absence of a discharge constituting an open circuit in said conductor which is closed on the occurrence of a discharge, an initiating electrode disposed adjacent to said mercury electrode, said initiating electrode being so related to said other electrodes that when a current passes between said initiating electrode and said mercury electrode a discharge is initiated between said mercury electrode and said collecting electrode, means for supplying a current between said initiating electrode and said mercury electrode, and means responsive to a fault for interrupting the supply of current between said initiating electrode and said mercury electrode.

16. In a system of transmission and distribution, a periodic current source, a load circuit, a conductor for connecting said source to said load, a discharge path in said conductor comprising an electrode of the mercury type and a collecting electrode to cooperate with said electrode of the mercury type, said mercury in the absence of a discharge presenting an unionized surface to said collecting electrode and said discharge path in the absence of a discharge constituting an open circuit in said conductor which is closed on the occurrence of a discharge, an initiating electrode disposed adjacent to said mercury electrode, said initiating electrode being so related to said other electrodes that when a current passes between said initiating electrode and said mercury electrode a discharge is initiated between said mercury electrode and said collecting electrode, means for supplying a current between said initiating electrode and said mercury electrode, the last said means including a discharge device having an anode, a hot cathode and a control electrode and means for impressing a potential between said control electrode and said cathode of such magnitude that normally said current is supplied to said initiating electrode and said mercury electrode, and means responsive to a fault for impressing a potential between said control electrode and said cathode that is of such magnitude that the supply of current between said initiating electrode and said mercury electrode is interrupted.

17. In an alternating current system of transmission and distribution, an alternating-current source, an alternating current load, a conductor for connecting said source to said load, a plurality of discharge paths in said conductor, each of said paths comprising an anode and a cathode of the mercury type, one of said paths being connected so that it passes current in one direction through said conductor and the other of said paths being connected so that it passes current in the opposite direction through said conductor, and said paths, in the absence of a discharge in either one, constituting an open circuit in said conductor which is closed on the occurrence of a discharge, an initiating electrode disposed adjacent to the cathode of each of said paths, said initiating electrode being so related to said other electrodes that when a current passes between said initiating electrode and a corresponding cathode a discharge is initiated between the corresponding anode and cathode, means for supplying an initiating current between each of said initiating electrodes and the corresponding cathode, the last said means including a discharge device having an anode, a hot cathode and a control electrode, to correspond to each initiating electrode and means for impressing a potential between the control electrodes and the cathodes of the discharge devices such that normally said initiating current is supplied to all of said initiating electrodes, coupling means between said discharge devices, and means responsive to a fault and coupled to said coupling means for simultaneously impressing potentials between the control electrodes and the cathodes of said discharge devices such that the supply of initiating current to all said initiating electrodes is interrupted.

RALPH N. STODDARD.